United States Patent
Miura (10) Patent No.: US 6,999,428 B2
(45) Date of Patent: Feb. 14, 2006

(54) CDMA TRANSMITTER/RECEIVER (75) Inventor: Tetsuya Miura, Tokyo (JP)

(73) Assignee: NEC Corporation, Tokyo (JP)

( * ) Notice: Subject to any disclaimer, the term of this patent is extended or adjusted under 35 U.S.C. 154(b) by 858 days.

(21) Appl. No.: 09/824,033

(22) Filed: Apr. 3, 2001

(65) Prior Publication Data

US 2001/0026544 A1 Oct. 4, 2001

(30) Foreign Application Priority Data

Apr. 4, 2000 (JP) ............................. 2000/102227

(51) Int. Cl.
H04B 7/216 (2006.01)
(52) U.S. Cl. ...................................... 370/318; 370/335
(58) Field of Classification Search ................ 370/206, 370/208, 209, 315, 317, 318, 319, 328, 332, 370/333, 335, 342, 441
See application file for complete search history.

(56) References Cited

U.S. PATENT DOCUMENTS 6,212,364 B1 * 4/2001 Park ............................. 455/69
6,421,331 B1 * 7/2002 Hulbert ....................... 370/335
2002/0094836 A1 * 7/2002 Nakamura et al. ........... 455/522
2002/0118729 A1 * 8/2002 Lomp et la. ................. 375/146
2003/0012267 A1 * 1/2003 Jitsukawa et al. ........... 375/148

* cited by examiner

Primary Examiner—Chi Pham
Assistant Examiner—Anh-Vu Ly
(74) Attorney, Agent, or Firm—Whitham, Curtis & Christofferson, PC (57) ABSTRACT A CDMA (Code Division Multiple Access) transmitter/receiver of the present invention includes a SIR (Signal-to-Interference Ratio) calculator for calculating SIRs of a received signal slot by slot. A command generating circuit generates, when the SIR decreases or increases, a transmission power control command that causes a station, which is sending the received signal, to lower or raise transmission power or generates, when the SIR continuously decreases over a preselected number of slots, a transmission power control-OFF command for interrupting transmission power control. The transmission power control command or the transmission power control-OFF command is inserted in a radio frame to be sent to the above station.

15 Claims, 8 Drawing Sheets

CDMA TRANSMITTER/RECEIVER

BACKGROUND OF THE INVENTION

The present invention relates to a CDMA (Code Division Multiple Access) transmitter/receiver constructed to control the rise of transmission power of another station for thereby obviating a sharp increase in up-going interference wave level.

In a cellular communication system using a CDMA scheme, all mobile stations called by a base station effect CDMA multipath communication by sharing the same frequency. This deteriorates receipt reception quality due to, e.g., fading, and raises the interference wave level due to distance, thereby lowering the subscriber capacity of the system. To solve this problem, high speed, closed loop, transmission power control is essential.

Transmission power control executed by a conventional CDMA transmitter/receiver will be briefly described hereinafter on the assumption that a base station controls the up-going transmission power of a mobile station on the basis of reception quality from the mobile station. So long as a base station constantly receives up-going radio frames from a mobile station, the former can stably control the transmission power of the latter. However, when a building, for example, shades the mobile station, it is likely that the signal level on the effective path, which the base station has grasped, is lowered and sharply lowers reception quality although the up-going path may remain in synchronism. In such a case, the base station sends to the mobile station a transmission power control command for causing the mobile station to raise up-going transmission power. In response, the mobile station sharply raises its up-going transmission power.

Assume that the transmission power of a certain mobile station sharply increases when the base station is communicating with a plurality of mobile stations at the same time. Then, the sharp rise of the transmission power influences signals being received by the other mobile stations in the same manner as an increase in an interference wave. This prevents the number of mobile stations connectable to the base station at the same time from satisfying a capacity that depends on the system and thereby causes the CDMA communication system to fail. A scheme capable of preventing the up-going power from sharply increasing as a result of the temporary deterioration of up-going reception quality has not been reported in the past.

Technologies relating to the present invention are disclosed in, e.g., Japanese Patent Laid-Open Publication Nos. 5-22213, 9-284205, 10-108249 and 11-340948 as well as in Japanese Patent No. 2, 982, 856.

SUMMARY OF THE INVENTION

It is an object of the present invention to provide a CDMA transmitter/receiver capable of controlling, when receipt quality from another station is sharply lowered, an increase in the transmission power of the above station, thereby preventing a subscriber capacity from decreasing.

A CDMA transmitter/receiver of the present invention includes a SIR (Signal-to-Interference Ratio) calculator for calculating the SIRs of a received signal slot by slot. A command generating circuit generates, when the SIR decreases or increases, a transmission power control command that causes a station, which is sending the received signal, to lower or raise transmission power or generates, when the SIR continuously decreases over a preselected number of slots, a transmission power control-OFF command for interrupting transmission power control. The transmission power control command or the transmission power control-OFF command is inserted in a radio frame to be sent to the above station.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

To better understand the present invention, brief reference will be made to a specific conventional CDMA transmitter/receiver, shown in FIG. 1. The following description will concentrate on control over the up-going transmission power of a mobile station, which a base station executes on the basis of up-going reception quality from the mobile station. Of course, the mobile station may control the down-going transmission power of the base station if the relation between the up-going and down-going channels and the relation between the base station and the mobile station are inverted.

Figure 1:
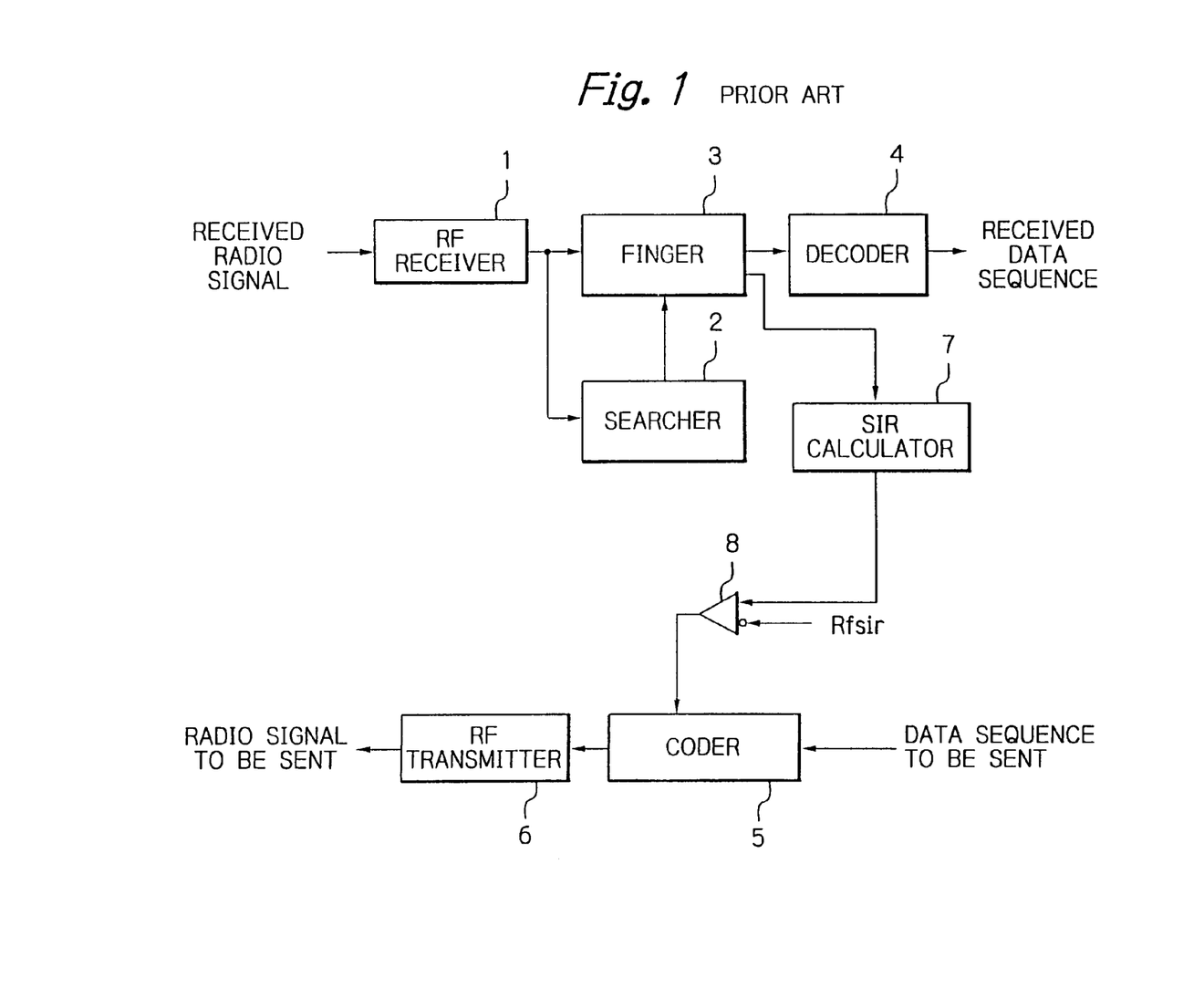
FIG. 1 is a schematic block diagram showing a specific conventional CDMA transmitter/receiver.

As shown in FIG. 1, the CDMA transmitter/receiver installed in a base station is generally made up of a RF (Radio Frequency) receiver 1, a searcher 2, a finger 3, a decoder 4, a coder 5, a RF transmitter 6, a SIR (Signal-to-Interference Ratio) calculator 7, and a comparator 8.

The RF receiver 1 executes band limitation, frequency conversion and other processing with a received radio signal for thereby converting the radio signal to a baseband signal. The baseband signal is input to the searcher 2 and finger 3. The searcher 2 searches, based on the input baseband signal, for the time of receipt of an effective path between the base station and a mobile station sending the signal and feeds the time of receipt to the finger 3. At the input of time of receipt from the searcher 2, the finger 3 executes inverse spreading with the received baseband signal by using a preselected inverse spread signal. The finger 3 then executes detection and rake processing with the inversely spread baseband signal and delivers the resulting signal to the decoder 4. The decoder 4 de-interleaves the signal output from the finger 3 and then executes error correction coding, CRC (Cyclic Redundancy Check) and other decode processing to thereby output a received data sequence.

The coder 5 executes CRC coding and error correction coding with a data sequence to be sent and then interleaves the data sequence to thereby generate a radio frame. Subsequently, the coder 5 spreads the radio frame by preselected spread coding, thereby producing a baseband signal to be sent, and feeds the baseband signal to the RF transmitter 6. The RF transmitter 6 transforms the input baseband signal to a radio signal to be sent and radiates the radio signal via an antenna (not shown).

The SIR calculator 7 calculates the SIR of each slot of the raked data input from the finger 3. The comparator 8 compares the actual SIR with a reference SIR(Rfsir). If the actual SIR is greater than the reference SIR Rfsir, then the comparator 8 generates a power-down command for causing the mobile station to lower its transmission power. If the actual SIR is smaller than the reference SIR Rfsir, then the comparator 8 generates a power-up command for causing the mobile station to raise the transmission power. The coder 5 inserts the above power-down command or the power-up command input from the comparator 8 in the preselected position of the radio frame.

Figure 2:
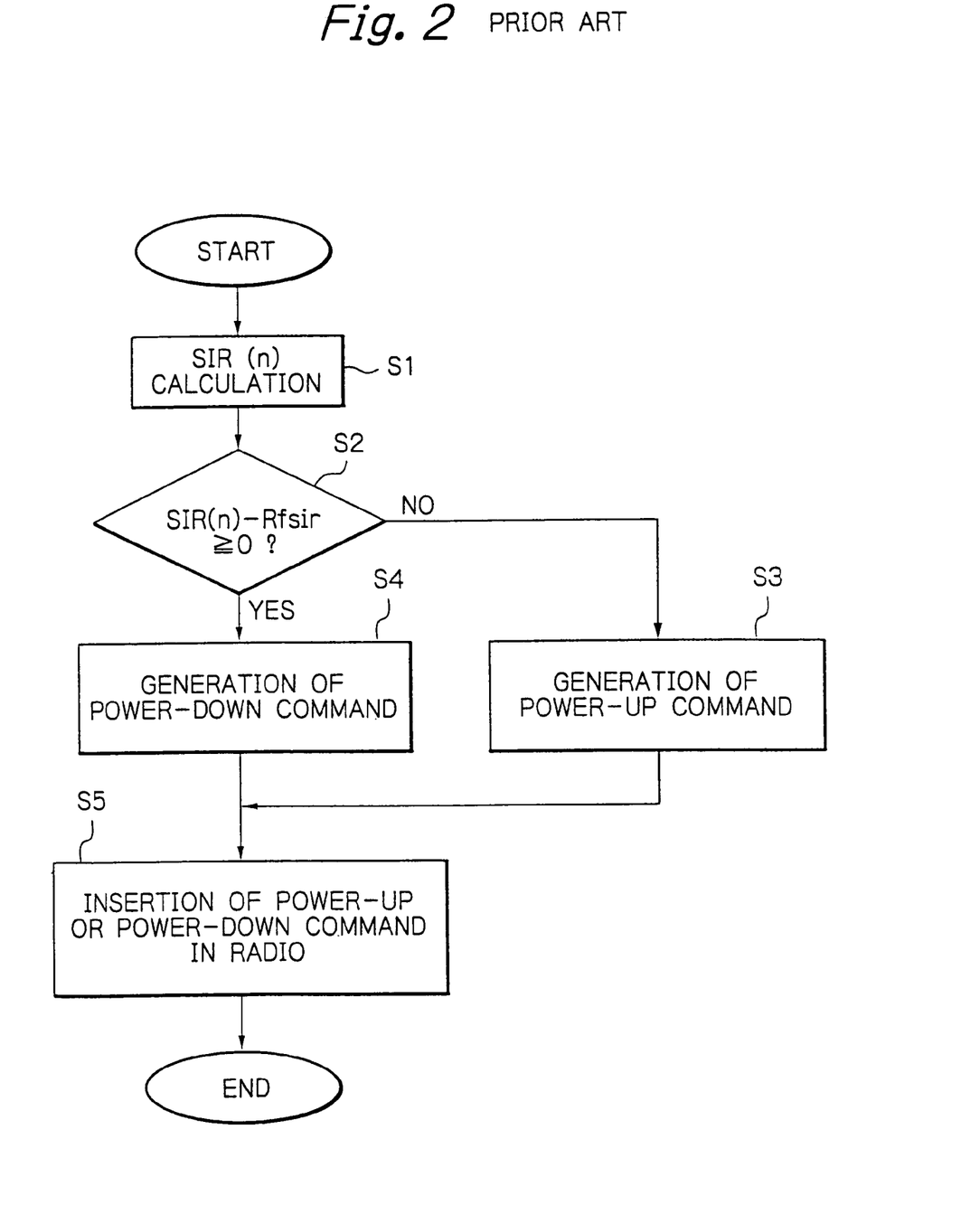
FIG. 2 is a flowchart demonstrating a transmission power control procedure available with the conventional CDMA transmitter/receiver.

The above operation of the conventional CDMA transmitter/receiver will be described more specifically with reference to FIG. 2. As shown, the SIR calculator 7 calculates the actual or received SIR(n) of a slot #n (step S1). The comparator 8 compares the actual SIR(n) and the reference SIR Rfsir to see if a difference therebetween (SIR(n)−Rfsir) is greater than or equal to zero (step S2). The comparator 8 outputs a power-up command, which may be (logical) ONE, if the answer of the step S2 is negative (NO, step S3) or outputs a power-down command, which may be (logical) ZERO, if it is positive (YES, step S4). The coder 5 inserts the up-command or the down-command in a radio frame (step S5).

The mobile station controls transmission power in accordance with the up-command or the down-command included in the received, down-going radio frame. More specifically, the transmission power of the mobile station is raised if the reception quality of the mobile station is low. As soon as expected reception quality is restored, the transmission power is again lowered.

The conventional control described above has the following problem left unsolved. Assume that the transmission power of a certain mobile station sharply increases when the base station is receiving signals from a plurality of mobile stations including the above mobile station. Then, the increase in transmission power influences the signals received from the other mobile stations in the same manner as an increase in interference wave. As a result, the number of mobile stations connectable to the base station at the same time is short of a capacity dependent on the system, causing the CDMA communication system to fail.

Figure 3:
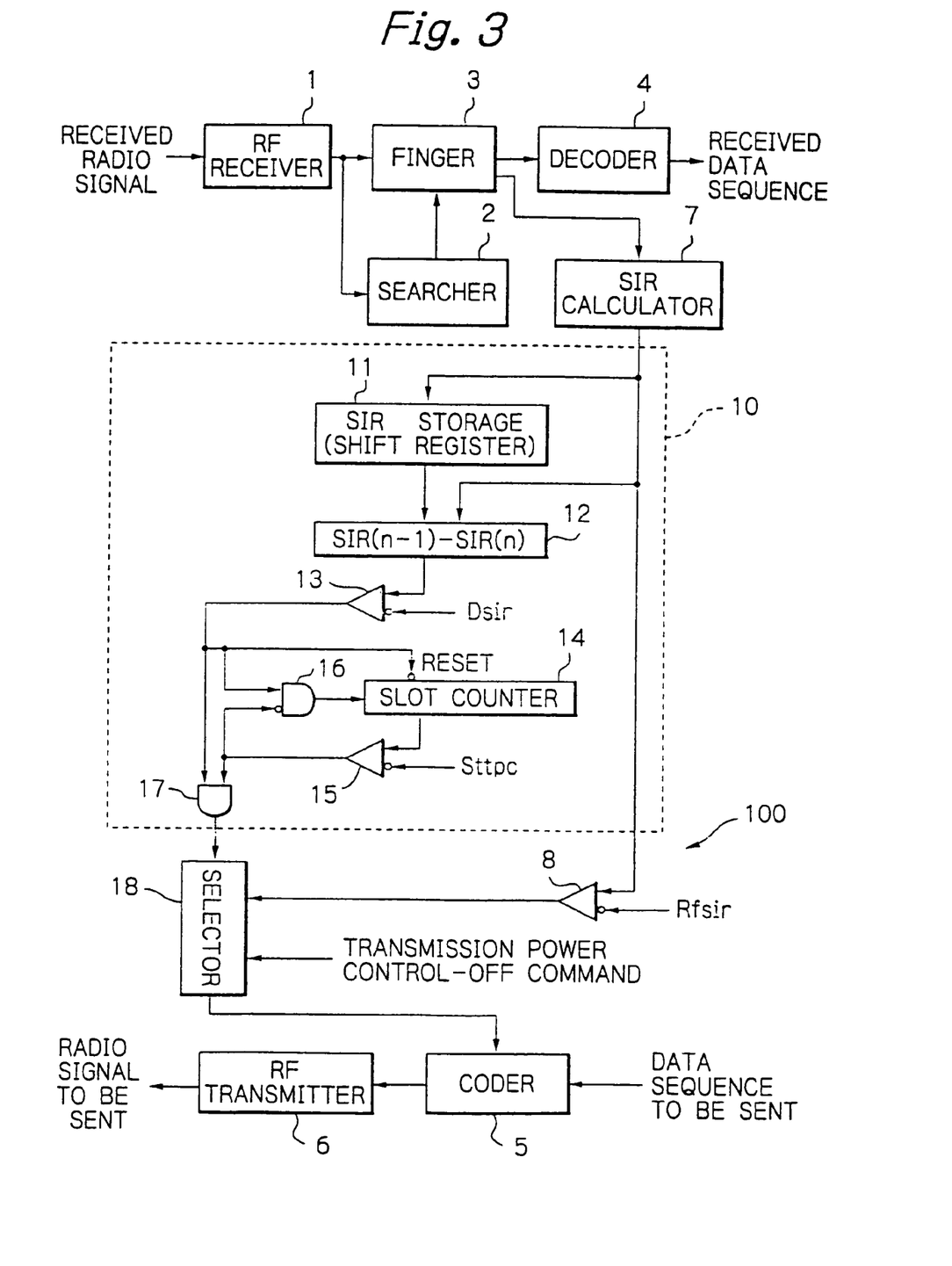
FIG. 3 is a schematic block diagram showing a CDMA transmitter/receiver embodying the present invention.

Referring to FIG. 3, a CDMA transmitter/receiver embodying the present invention will be described. As shown, the CDMA transmitter/receiver includes a RF receiver 1, a searcher 2, a finger 3, a decoder 4, a coder 5, and a RF transmitter 6. The CDMA transmitter/receiver additionally includes a SIR calculator 7, a comparator 8, a command select signal generator 10, and a selector 18. The comparator 8, command select signal generator 10 and selector 18 constitute a command generating circuit 100 in combination.

The RF receiver 1, searcher 2, finger 3, decoder 4, coder 5, RF transmitter 6, SIR calculator 7 and comparator 8 are constructed and operated in the same manner as in FIG. 1 and will not be described specifically in order to avoid redundancy.

The command select signal generator 10 is made up of a SIR storage 11, a subtractor (SIR(n−1)−SIR(n)) 12, a comparator 13, a slot counter 14, a comparator 15, and AND gates 16 and 17. The SIR storage 11, implemented by a shift register by way of example, stores consecutive SIRs calculated by the SIR calculator 7 slot by slot, while outputting the SIR of a slot immediately preceding the current slot (preceding slot hereinafter). The subtractor 12 subtracts the SIR of the preceding slot fed from the SIR storage 11 from the SIR of the current slot fed from the SIR calculator 7. The comparator 13 compares a difference output from the subtractor 12 with a threshold Dsir assigned to the variation of the received SIR. The comparator 13 then outputs ONE if the above difference is equal to or greater than the threshold Dsir or outputs ZERO if the former is smaller than the latter.

The output of the comparator 13 is input to the reset input of the slot counter 14. When the output of the comparator is ZERO, the slot counter 14 is cleared and enabled by the output of the AND gate 16 so as to up-count consecutive slots. The comparator 15 compares the count Ct of the slot counter 14 and a threshold Sttpc assigned to the count. The comparator 15 outputs ONE if the count Ct is equal to or greater than the threshold Sttpc or outputs ZERO if the former is smaller than the latter. The AND gate 16 feeds an enable signal to the slot counter 14 if the output of the comparator 13 and that of the comparator 15 are ONE and ZERO, respectively. The AND gate 17 outputs ONE if the output of the comparator 13 and that of the comparator 15 both are ZERO or outputs ZERO if otherwise. The output of the AND gate 17 is input to the selector 18 as a command select signal.

When the command select signal output from the AND gate 17 is ZERO, the selector 18 selects a transmission power control command output from the comparator 8. When the command select signal is ONE, the selector 18 selects a transmission power control-OFF command output from a command generating circuit, not shown, and feeds it to the coder 5. The coder 5 inserts either the transmission power command or the transmission power control-OFF command in the preselected position of a radio frame to thereby generate a baseband signal to be sent. This baseband signal is input to the RF transmitter 6. The RF transmitter 6 transforms the baseband signal to a radio signal to be sent and radiates the radio signal via an antenna not shown.

Figure 4:
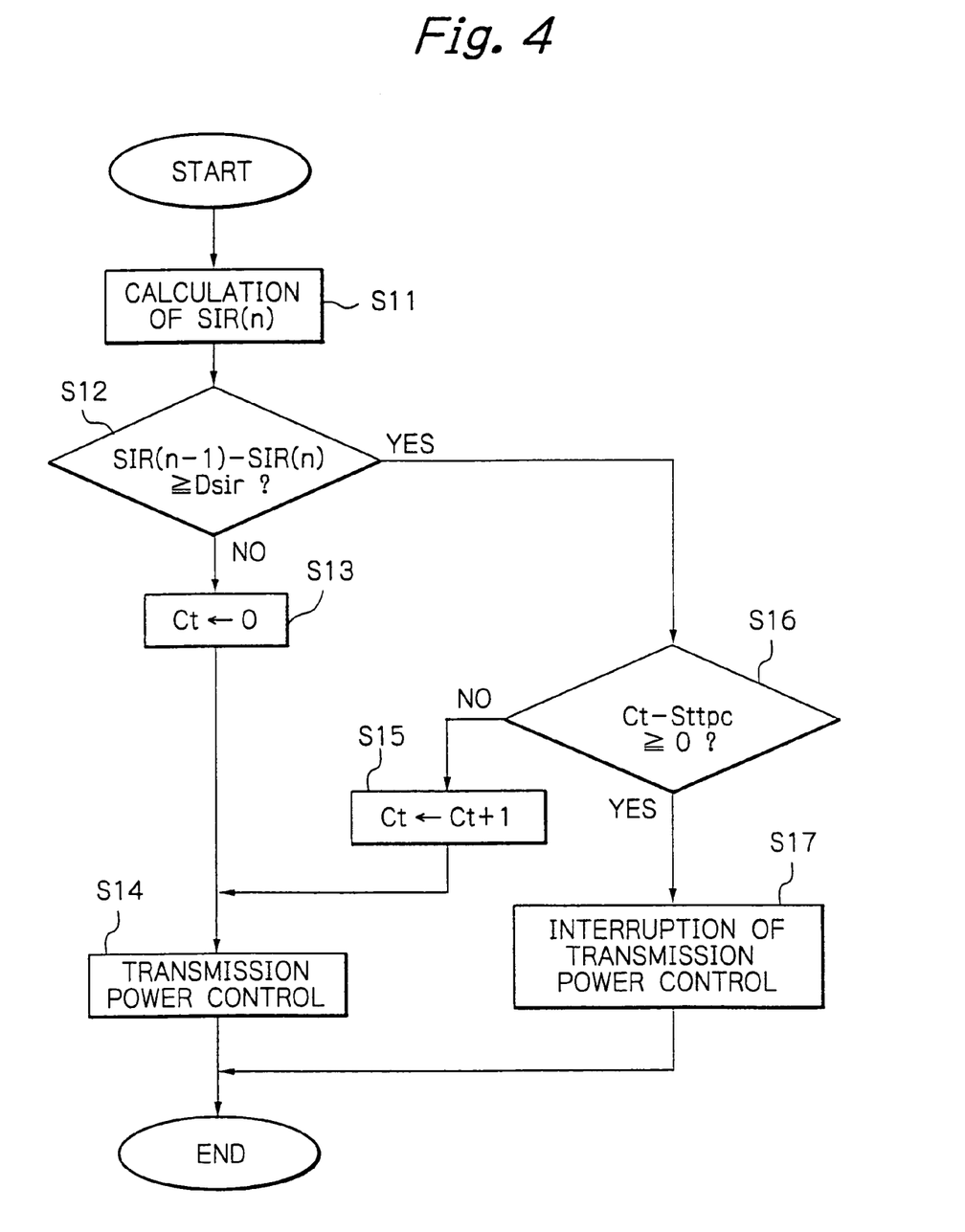
FIG. 4 is a flowchart showing a specific transmission power control procedure unique to the illustrative embodiment.

Reference will also be made to FIG. 4 for describing control over up-going transmission power executed by the command generating circuit 100. As shown, the SIR calculator 7 calculates the SIRs (SIR(n)) of the consecutive slots #n by using the raked data output from the finger 3 (step S11). The SIR storage 11 stores the SIR (SIR(n)) of the current slot while outputting the SIR (SIR(n−)) of the preceding slot. The subtractor 12 produces a difference between the SIR of the preceding slot and the SIR of the current slot. The comparator 13 compares the difference output from the subtractor 12 and the threshold Dsir (step S12).

If the difference output from the subtractor 12 is equal to or greater than the threshold Dsir (YES, step S12), then the slot counter 14 is cleared (step S13). As a result, the AND gate 17 outputs the command select signal that is ONE. In response, the selector 18 selects the usual transmission power control command output from the comparator 8 and outputs it (step S14). The coder 5 inserts the above transmission power control command in a down-going radio frame.

More specifically, if the received SIR is equal to or greater than the reference SIR(Rfsir), as determined by the comparator 8, the transmission power control command commands the mobile station to raise its up-going transmission power. This is identical with the conventional transmission power control.

Assume that the difference in SIR between the current slot and the preceding slot is equal to or greater than the threshold Dsir (YES, step S12), and that the difference between the count Ct and the threshold Sttpc, as determined by the comparator 15, is smaller than zero (NO, step S16). Then, the slot counter 14 is enabled by the output of the AND gate 16 and incremented every slot (step S15).

When the difference in SIR between the consecutive slots is greater or equal to the threshold Dsir, the slot counter 14 is not cleared. In this condition, assume that the answer of the step S16 changes from NO to YES, i.e., the difference between the count Ct of the slot counter 14 and the threshold Sttpc is equal to or greater than zero. Then, the command select signal output from the AND gate 17 changes from ZERO to ONE and causes the selector 18 to select the transmission power control-OFF command (step S17). Again, the coder 5 inserts the transmission power control-OFF command in a down-going radio frame. The transmission control-OFF command may consist of power-down commands and power-up commands alternating with each other slot by slot, e.g., a sequence of ZEROs and ONEs alternating with each other. Such a control-OFF command successful ly prevents the transmission power of a mobile station from varying.

In this manner, when the SIR decreases between consecutive slots by more than the threshold Dsir and continuously decreases more than Sttpc times, the illustrative embodiment interrupts transmission power control in order to prevent the transmission power of a mobile station from increasing. In the illustrative embodiment, the above thresholds Dsir and Sttpc each have a particular value capable of sufficiently dealing with the variation of fading, which is assumed to follow the transmission power control.

As stated above, the illustrative embodiment monitors SIRs representative of the quality of a signal being received from a mob ile station. Only when the SIR continuously decreases over a preselected number of consecutive slots by more than a preselected threshold each time, the illustrative embodiment interrupts control over up-going transmission power. The illustrative embodiment therefore reduces an apparent increase in the up-going interference wave levels of the other mobile stations ascribable to the transmission from the above mobile station. This successful ly prevents the subscriber capacity from sharply decreasing.

Figure 5:
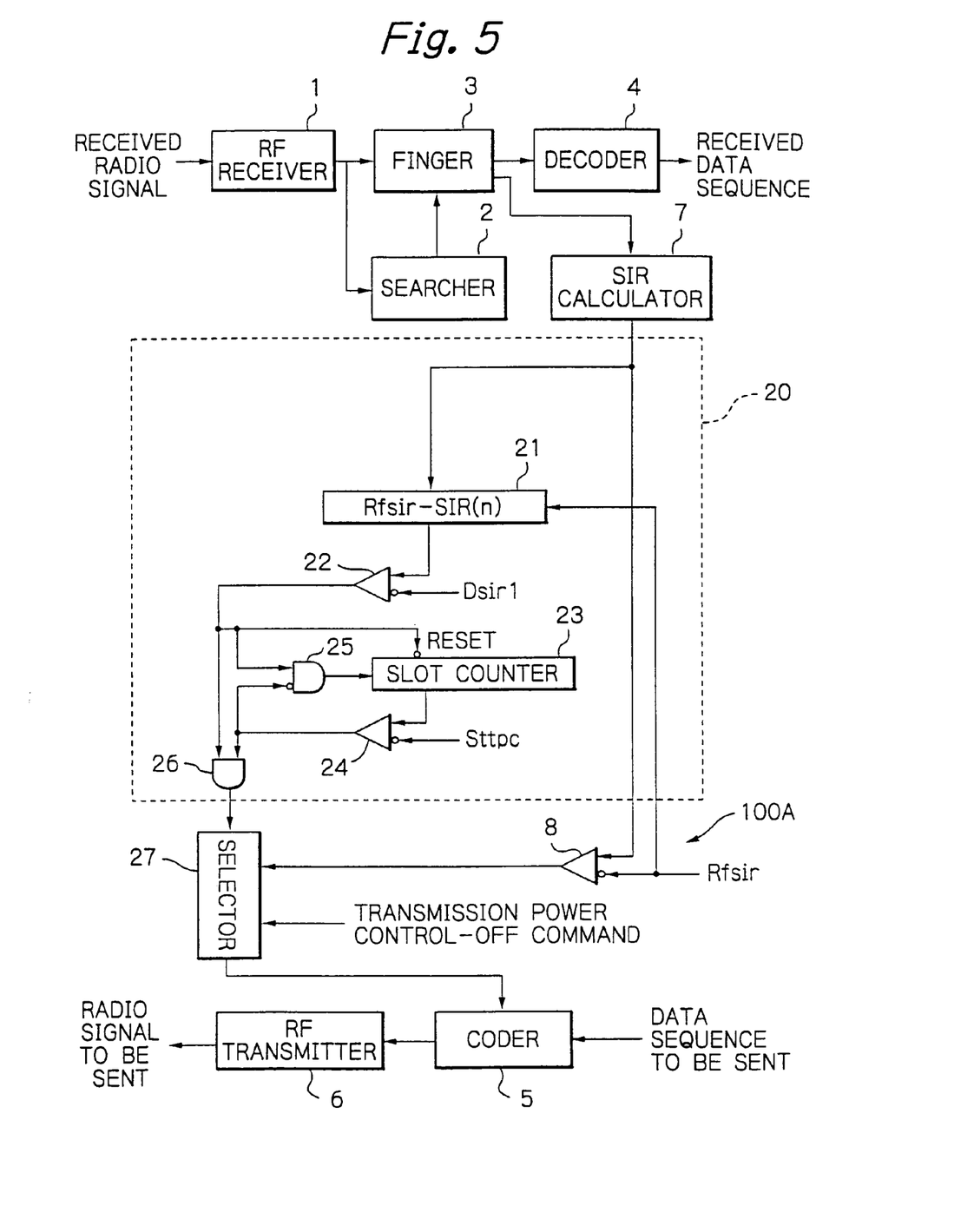
FIG. 5 is a schematic block diagram showing an alternative embodiment of the present invention.

An alternative embodiment of the present invention will be described with reference to FIG. 5. As shown, the CDMA transmitter/receiver includes a command select signal generator 20 and a selector 27 as well as the RF receiver 1, searcher 2, finger 3, decoder 4, coder 5, RF transmitter 6, SIR calculator 7, and comparator 8. The comparator 8, command select signal generator 20 and selector 27 constitute a command generating circuit 100A. The RF receiver 1, searcher 2, finger 3, decoder 4, coder 5, RF transmitter 6, SIR calculator 7 and comparator 3 are constructed and operated in the same manner as in FIG. 3 and will not be described specifically in order to avoid redundancy.

In the illustrative embodiment, the command select generator 20 includes a subtractor 21, a comparator 22, a slot counter 23, a comparator 24, and AND gates 25 and 26. The subtractor 21 subtracts the SIR of the current slot output from the SIR calculator 7 from a reference SIR(Rfsir). The comparator 22 compares a difference output from the subtractor 21 with a threshold assigned to the variation of the received SIR. The comparator 22 then outputs ONE if the above difference is equal to or greater than the threshold Dsir1 or outputs ZERO if the former is smaller than the latter.

The output of the comparator 22 is input to the reset input of the slot counter 23. When the output of the comparator 22 is ZERO, the slot counter 23 is cleared and enabled by the output of the AND gate 25 so as to up-count consecutive slots. The comparator 24 compares the count Ct of the slot counter 23 and a threshold Sttpc assigned to the count. The comparator 24 outputs ONE if the count Ct is equal to or greater than the threshold Sttpc or outputs ZERO if the former is smaller than the latter. The AND gate 16 feeds an enable signal to the slot counter 14 if the output of the comparator 13 and that of the comparator 15 are ONE and ZERO, respectively. The AND gate 25 outputs an enable signal meant for the slot counter 23 if the output of the comparator 22 is ONE and if the output of the comparator 24 is ZERO. The AND gate 26 outputs ONE if the output of the comparator 22 and that of the comparator 24 both are ONE or outputs ZERO if otherwise. The output of the AND gate 26 is input to the selector 27 as a command select signal.

When the command select signal is ZERO, the selector 27 selects a transmission power control command output from the comparator 8. When the command select signal is ONE, the selector 18 selects a transmission power control-OFF command output from a command generating circuit, not shown, and feeds it to the coder 5. The coder 5 inserts either the transmission power control command or the transmission power control-OFF command output from the selector 27 in the preselected position of a radio frame to thereby generate a baseband signal to be sent. This baseband signal is input to the RF transmitter 6. The RF transmitter 6 transforms the baseband signal to a radio signal to be sent and radiates the radio signal via an antenna not shown.

Figure 6:
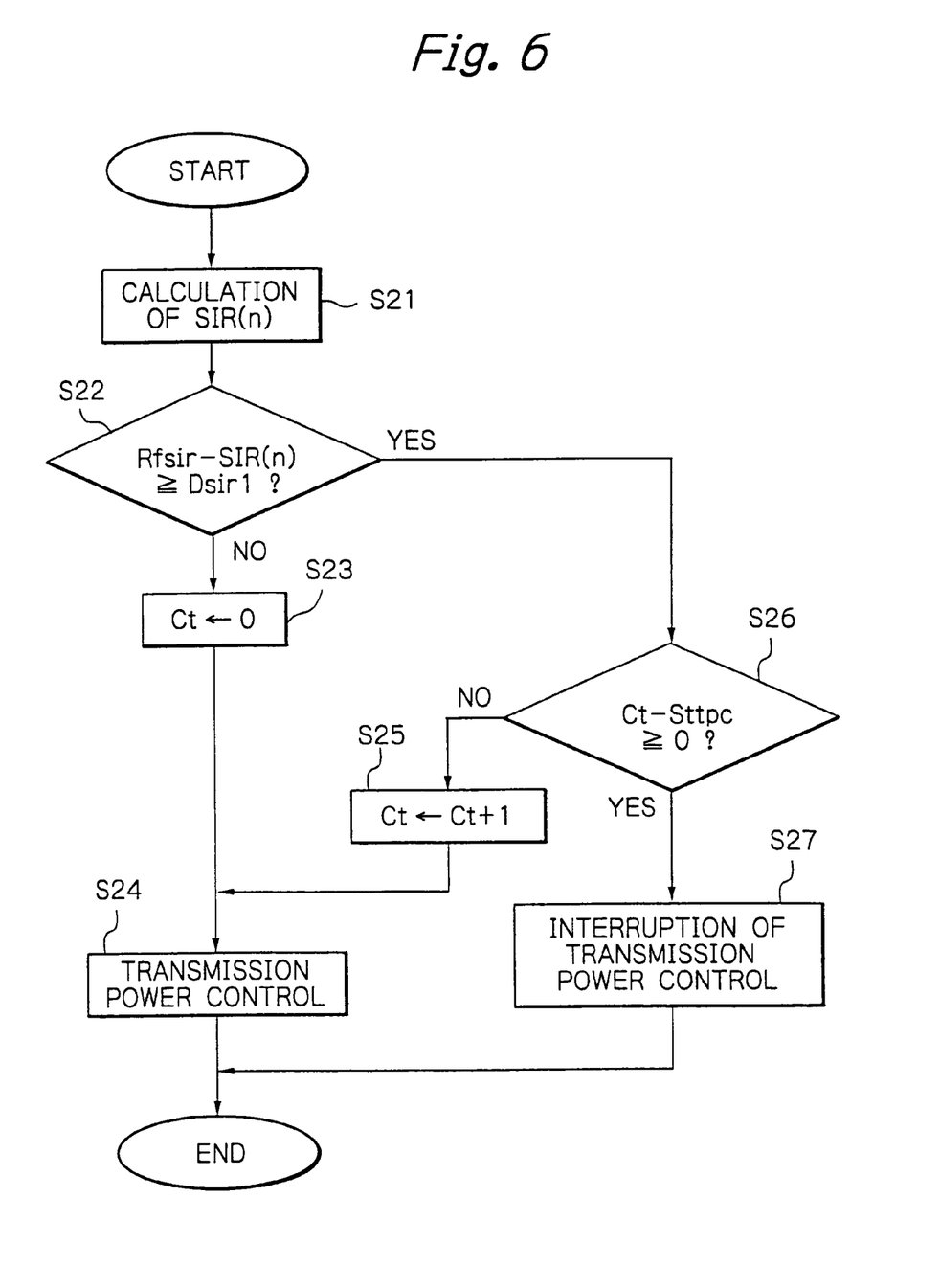
FIG. 6 is a flowchart demonstrating a specific transmission power control procedure available with the embodiment of FIG. 5.

Reference will also be made to FIG. 6 for describing control over up-going transmission power executed by the command generating circuit 100A. As shown, the SIR calculator 7 calculates the SIRs (SIR(n)) of the consecutive slots #n by using the raked data output from the finger 3 (step S21). The subtractor 21 produces a difference between the reference SIR (Rfsir) and the SIR of the current slot (SiR (n)). The comparator 22 compares the difference output from the subtractor 21 and the threshold Dsir1 (step S22).

If the difference output from the subtractor 22 is smaller than the threshold Dsir1 (NO, step S12), then the slot counter 23 is cleared (step S23). As a result, the AND gate 26 outputs the command select signal that is ZERO. In response, the selector 27 selects the usual transmission power control command output from the comparator 8 and outputs it (step S24). The coder 5 inserts the above transmission power control command in a down-going radio frame.

More specifically, if the received SIR is equal to or greater than the reference SIR (Rfsir), as determined by the comparator 8, the transmission power control command commands the mobile station to lower its transmission power; if otherwise, the command commands the mobile station to raise the transmission power. This is identical with the conventional transmission power control.

Assume that the difference between the reference SIR (Rfsir) and the current SIR (SIR(n)) is equal to or greater than the threshold Dsir1 (step S22), and that the difference between the count Ct and the threshold Sttpc, as determined by the comparator 22, is smaller than zero, as determined by the comparator 24 (NO, step S26). Then, the slot counter 23 is enabled by the output of the AND gate 25 and incremented every slot (step S25).

When the difference between the reference SIR and the actual SIR is equal to or greater than the threshold Dsir1 (YES, step S22), the slot counter 23 is not cleared. In this condition, assume that the answer of the step S26 changes from NO to YES, i.e., the difference between the count Ct of the slot counter 23 and the threshold Sttpc is equal to or greater than zero. Then, the command select signal output from the AND gate 26 changes from ZERO to ONE and causes the selector 27 to select the transmission power control-OFF command (step S27). Again, the coder 5 inserts the transmission power control-OFF command in a downgoing radio frame. The transmission control-OFF command may consist of power-down commands and power-up commands alternating with each other, as in the previous embodiment.

In this manner, when the actual SIR decreases below the reference SIR by more than the threshold Dsir1 and continuously decreases more than Sttpc consecutive times, the illustrative embodiment interrupts transmission power control in order to prevent the transmission power of a mobile station from increasing. In the illustrative embodiment, too, the above thresholds Dsir1 and Sttpc each have a particular value capable of sufficiently dealing with the variation of fading, which is assumed to follow the transmission power control.

As stated above, the illustrative embodiment monitors SIRs representative of the quality of a signal being received from a mobile station. Only when the actual SIR continuously decreases below the reference SIR over a preselected number of consecutive slots by more than a preselected threshold each time, the illustrative embodiment interrupts control over up-going transmission power. Therefore, only when the actual SIR remains far below the reference SIR, the illustrative embodiment reduces an apparent increase in the up-going interference wave levels of the other mobile stations ascribable to the transmission from the above mobile station. This successfully prevents the subscriber capacity from sharply decreasing.

Figure 7:
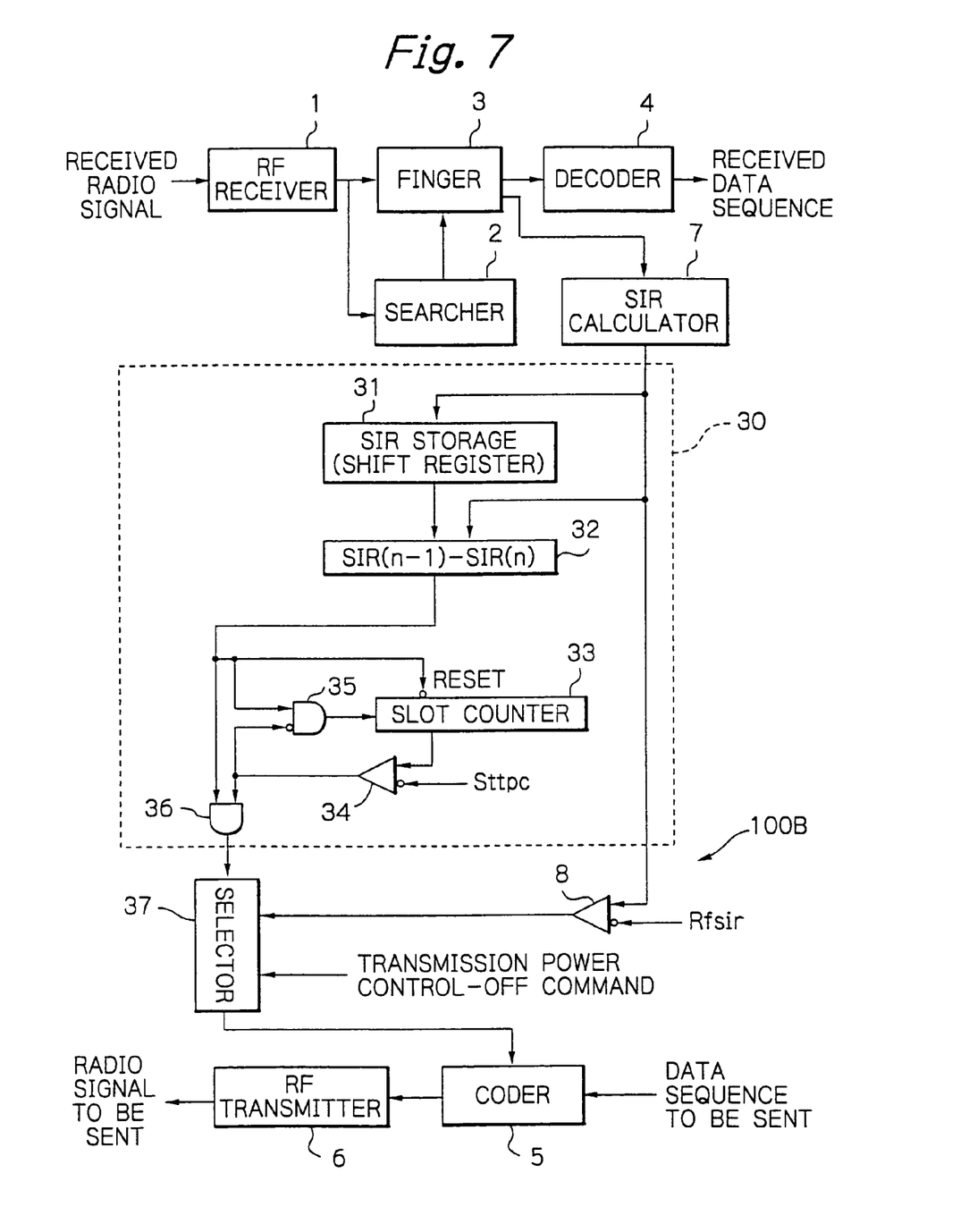
FIG. 7 is a schematic block diagram showing another alternative embodiment of the present invention.

FIG. 7 shows another alternative embodiment of the present invention. As shown, the CDMA transmitter/receiver includes a command select signal generator 30 and a selector 37 as well as the RF receiver 1, searcher 2, finger 3, decoder 4, coder 5, RF transmitter 6, SIR calculator 7, and comparator 8. The comparator 8, command select signal generator 30 and selector 37 constitute a command generating circuit 100B in combination.

The RF receiver 1, searcher 2, finger 3, decoder 4, coder 5, RF transmitter 6, SIR calculator 7 and comparator 8 are constructed and operated in the same manner as in FIG. 3 and will not be described specifically in order to avoid redundancy.

The command select signal generator 30 is made up of an SIR storage 31, a subtractor (SIR(n-1)-SIR(n)) 32, a slot counter 33, a comparator 35, and an AND gate 36. The SIR storage 31, implemented by a shift register by way of example, stores consecutive SIRs calculated by the SIR calculator 7 slot by slot, while outputting the SIR of the preceding slot. The subtractor 32 subtracts the SIR of the current slot fed from the SIR calculator 7 from the SIR of the preceding slot fed from the SIR storage 11.

The output of the subtractor 32 is input to the reset input of the slot counter 33. When the difference output from the subtractor 32 is smaller than zero, the slot counter 33 is cleared and enabled by the output of the AND gate 35 so as to up-count consecutive slots. The comparator 34 compares the count Ct of the slot counter 33 and the threshold Sttpc assigned to the count. The comparator 34 outputs ONE if the count Ct is equal to or greater than the threshold Sttpc or outputs ZERO if the former is smaller than the latter. The AND gate 35 feeds an enable signal to the slot counter 33 if the output of the subtractor 32 is equal to or greater than zero and if the output of the comparator 34 is ZERO. The AND gate 36 outputs ONE if the output of the subtractor 32 is equal to or greater than zero and if the output of the comparator 34 is ONE or outputs ZERO if otherwise. The output of the AND gate 36 is input to the selector 37 as a command select signal.

When the command select signal output from the AND gate 36 is ZERO, the selector 37 selects the transmission power control command output from the comparator 8. When the command select signal is ONE, the selector 37 selects the transmission power control-OFF command output from the command generating circuit, not shown, and feeds it to the coder 5. The coder 5 inserts either the transmission power command or the transmission power control-OFF command in the preselected position of a radio frame to thereby generate a baseband signal to be sent. This baseband signal is input to the RF transmitter 6. Again, the RF transmitter 6 transforms the baseband signal to a radio signal to be sent and radiates the radio signal via the antenna not shown.

Figure 8:
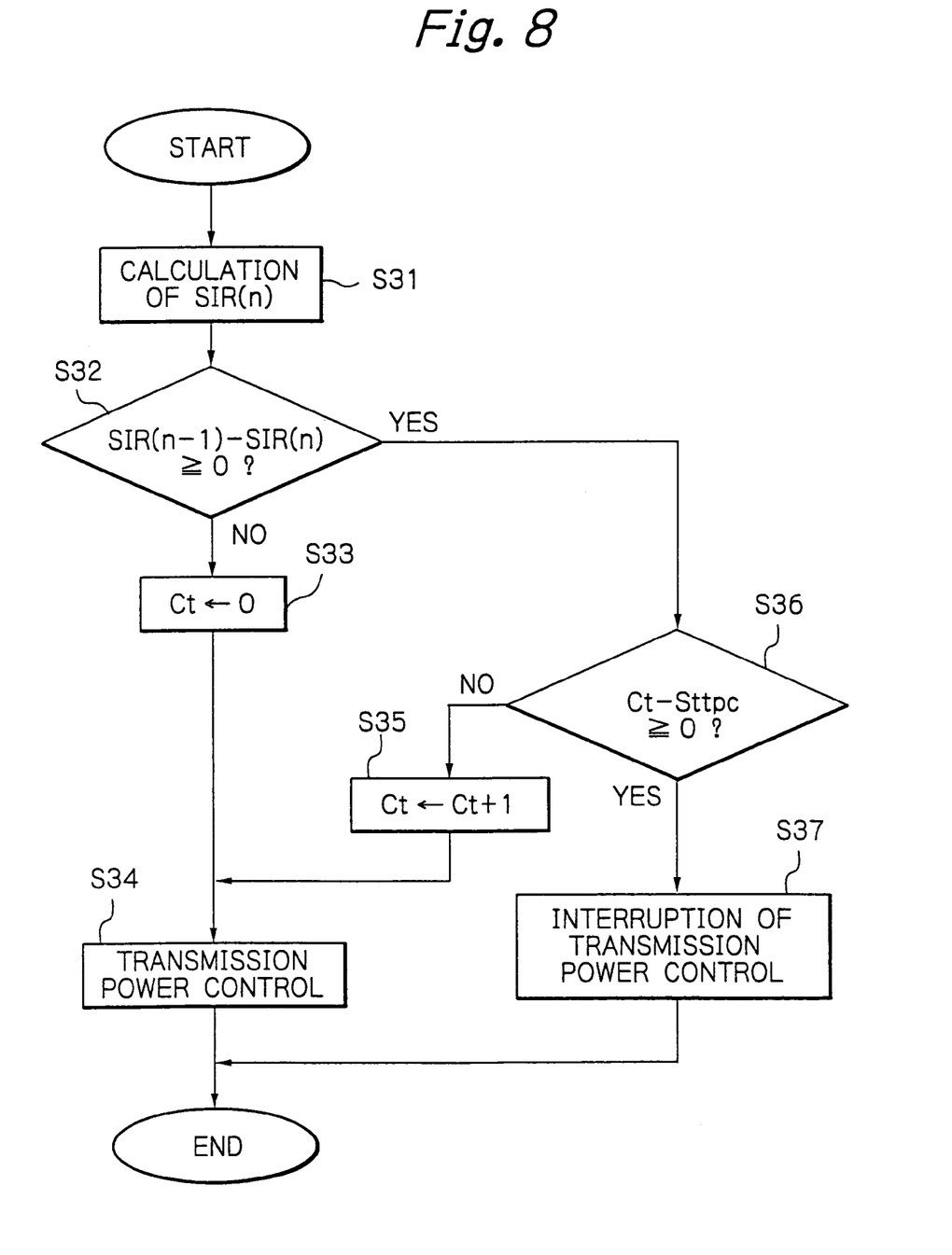
FIG. 8 is a flowchart demonstrating a specific transmission power control procedure available with the embodiment of FIG. 7.

Reference will also be made to FIG. 8 for describing control over up-going transmission power executed by the command generating circuit 100B. As shown, the SIR calculator 7 calculates the SIRs (SIR(n)) of the consecutive slots #n by using the raked data output from the finger 3 (step S31). The SIR storage 11 stores the SIR (SIR(n)) of the current slot while outputting the SIR (SIR(n-1)) of the preceding slot. The subtractor 32 produces a difference between the SIR of the preceding slot and the SIR of the current slot (step S32).

If the difference output from the subtractor 32 is smaller than zero (NO, step S32), then the slot counter 14 is cleared (step S35). As a result, the AND gate 36 outputs the command select signal that is ZERO. In response, the selector 37 selects the usual transmission power control command output from the comparator 8 and outputs it (step S34). The coder 5 inserts the above transmission power control command in a down-going radio frame.

More specifically, if the received SIR is equal to or greater than the reference SIR(Rfsir), as determined by the comparator 8, the transmission power control command commands the mobile station to lower its transmission power; if otherwise, the command commands the mobile station to raise the transmission power. This is identical with the conventional transmission power control.

Assume that the difference in SIR between the current slot and the preceding slot is equal to or greater than zero (YES, step S32), and that the difference between the count Ct and the threshold Sttpc is smaller than zero (NO, step S36). Then, the slot counter 33 is enabled by the output of the AND gate 35 and incremented every slot (step S35).

When the difference in SIR between the consecutive slots is greater than or equal to zero, the slot counter 33 is not cleared. In this condition, assume that the answer of the step S36 changes from NO to YES, i.e., the difference between the count Ct of the slot counter 33 and the threshold Sttpc is equal to or greater than zero. Then, the command select signal output from the AND gate 36 changes from ZERO to ONE and causes the selector 37 to select the transmission power control-OFF command (step S37). Again, the coder 5 inserts the transmission power control-OFF command in a down-going radio frame. The transmission control-OFF command may consist of power-down commands and power-up commands alternating with each other slot by slot, as in the previous embodiments.

In this manner, when the SIR continuously decreases between consecutive slots more than Sttpc times, the illustrative embodiment interrupts transmission power control in order to prevent the transmission power of a mobile station from increasing. In the illustrative embodiment, too, the above threshold relating to the above number of times has a value capable of sufficiently dealing with the variation of fading, which is assumed to follow the transmission power control.

As stated above, the illustrative embodiment monitors SIRs representative of the quality of a signal being received from a mobile station. Only when the SIR continuously decreases more than a preselected number of times, the illustrative embodiment interrupts control over up-going transmission power. The illustrative embodiment therefore minutely monitors the SIRs in order to control an apparent increase in the up-going interference wave levels of the other mobile stations ascribable to the transmission from the above mobile station. This successfully prevents the subscriber capacity from sharply decreasing.

The embodiments shown and described are only illustrative and not restrictive. For example, the present invention is similarly applicable to down-going transmission power control to be executed by a mobile station, as distinguished from a base station, only if the relation between the base station and the mobile station shown and described is inverted.

In summary, it will be seen that the present invention provides a CDMA transmitter/receiver having the following unprecedented advantage. The transmitter/receiver monitors SIRs representative of the quality of a signal being received from a mobile station (or a base station). Only when the SIR continuously decreases over more than a preselected period, the transmitter/receiver interrupts control over the transmission power of the mobile station (or the base station). The transmitter/receiver therefore controls an apparent increase in the up-going interference wave levels of the other stations ascribable to the transmission from the above mobile station (or base station). This successfully prevents the subscriber capacity from sharply decreasing.

Various modifications will become possible for those skilled in the art after receiving the teachings of the present disclosure without departing from the scope thereof.

What is claimed is:

1. A CDMA (Code Division Multiple Access) transmitter/receiver comprising:
   SIR (Signal-to-Interference Ratio) calculating means for calculating SIRs of a received signal slot by slot; and
   command generating means for generating a transmission power control command and a transmission power control-OFF command
      said transmission power control command being generated when the SIR decreases or increases from a reference value,
   said transmission power control command being a command that causes a station, which is sending the received signal, to lower or raise transmission power so as to restore the SIR toward the reference value,
      said transmission power control-OFF command for interrupting a transmission power control being generated when the SIR continuously decreases over a preselected number of slots;
   wherein said transmission power control-OFF command, if generated, is inserted in a radio frame to be sent to the station, otherwise said transmission power control command is inserted in said radio frame.

2. The CDMA transmitter/receiver as claimed in claim 1, wherein said command generating means comprises:
   transmission power control command generating means for generating said transmission power control command by determining whether or not a difference between the SIR of a current slot and a reference SIR is equal to or greater than zero;
   command select signal generating means for counting slots over which a difference between the SIR of an immediately preceding slot and the SIR of the current slot is equal to or greater than a preselected threshold assigned to SIRs, and generating a command select signal having a particular status in each of
      a) a case wherein said difference is smaller than said preselected threshold assigned to SIRs or a number of slots counted is smaller than a preselected threshold assigned to slots and
      b) a case wherein said difference is equal to or greater than said threshold and said number of slots counted is equal to or greater than said threshold assigned to slots; and
   a selector for selecting either one of said transmission power control command and said transmission power control-OFF command in accordance with said command select signal.

3. The CDMA transmitter/receiver as claimed in claim 2, wherein said transmission power control-OFF command comprises a transmission power control command for lowering the transmission power and a transmission power control command for raising said transmission power that alternate with each other slot by slot.

4. The CDMA transmitter/receiver as claimed in claim 2, wherein said command select signal generating means comprises:
   SIR storing means for storing the SIR of the current slot while outputting the SIR of the immediately preceding slot;
   subtracting means for subtracting the SIR of the current slot from the SIR of the immediately preceding slot; and
   counter means for counting the number of slots over which a difference output from said subtracting means is equal to or greater than the preselected threshold assigned to SIRs;
   wherein said command select signal has a particular status in each of
      a) a case wherein the difference output from said subtracting means is smaller than the preselected threshold assigned to SIRs or the number of slots counted is smaller than the preselected threshold assigned to slots and
      b) a case wherein said difference output from said subtracting means is equal to or greater than said preselected SIR threshold and said number of slots counted is equal to or greater than said preselected threshold assigned to slots.

5. The CDMA transmitter/receiver as claimed in claim 4, wherein said transmission power control-OFF command comprises a transmission power control command for lowering the transmission power and a transmission power control command for raising said transmission power that alternate with each other slot by slot.

6. The CDMA transmitter/receiver as claimed in claim 1, wherein said command generating means comprises:
    transmission power control command generating means for generating said transmission power control command by determining whether or not a difference between the SIR of a current slot and a reference SIR is equal to or greater than zero;
    command select signal generating means for counting slots over which a difference between the SIR of the current slot and a reference SIR is equal to or greater than a preselected threshold assigned to SIRs, and generating a command select signal having a particular status in each of
        a) a case wherein said difference is smaller than said preselected threshold assigned to SIRs or a number of slots counted is smaller than a preselected threshold assigned to slots and
        b) a case wherein said difference is equal to or greater than said threshold and said number of slots counted is equal to or greater than said preselected threshold; and
    a selector for selecting either one of said transmission power control command and said transmission power control-OFF command in accordance with said command select signal.

7. The CDMA transmitter/receiver as claimed in claim 6, wherein said transmission power control-OFF command comprises a transmission power control command for lowering the transmission power and a transmission power control command for raising said transmission power that alternate with each other slot by slot.

8. The CDMA transmitter/receiver as claimed in claim 6, wherein said command select signal generating means comprises:
    subtracting means for subtracting the SIR of the current slot from a reference SIR; and
    counter means for counting slots over which a difference output from said subtracting means is equal to or greater than the preselected SIR threshold;
    wherein said command select signal has a particular status in each of
        a) a case wherein the difference output from said subtracting means is smaller than the preselected threshold assigned to SIRs or the number of slots counted is smaller than the preselected threshold assigned to slots and
        b) a case wherein said difference output from said subtracting means is equal to or greater than said threshold assigned to SIRs and said number of slots counted is equal to or greater than said preselected threshold assigned to slots.

9. The CDMA transmitter/receiver as claimed in claim 8, wherein said transmission power control-OFF command comprises a transmission power control command for lowering the transmission power and a transmission power control command for raising said transmission power that alternate with each other slot by slot.

10. The CDMA transmitter/receiver as claimed in claim 1, wherein said command generating means comprises:
    transmission power control command generating means for generating said transmission power control command by determining whether or not a difference between the SIR of a current slot and a reference SIR is equal to or greater than zero;
    command select signal generating means for counting slots over which a difference between the SIR of an immediately preceding slot and the SIR of the current slot is equal to or greater than zero, and generating a command select signal having a particular status in each of
        a) a case wherein said difference is smaller than a preselected threshold assigned to SIRs or a number of slots counted is smaller than a preselected threshold assigned to slots and
        b) a case wherein said difference is equal to or greater than zero and said number of slots counted is equal to or greater than said preselected threshold assigned to slots; and
    a selector for selecting either one of said transmission power control command and said transmission power control-OFF command in accordance with said command select signal.

11. The CDMA transmitter/receiver as claimed in claim 10, wherein said transmission power control-OFF command comprises a transmission power control command for lowering the transmission power and a transmission power control command for raising said transmission power that alternate with each other slot by slot.

12. The CDMA transmitter/receiver as claimed in claim 11, wherein said command select signal generating means comprising:
    SIR storing means for storing the SIR of the current slot while outputting the SIR of the immediately preceding slot;
    subtracting means for subtracting the SIR of the current slot from the SIR of the immediately preceding slot; and
    counter means for counting the number of slots over which a difference output from said subtracting means is greater than or equal to zero;
    wherein said command select signal has a particular status in each of
        a) a case wherein the different output from said subtracting means is smaller than zero or the number of slots counted is smaller than the preselected threshold assigned to slots and
        b) a case wherein said difference output from said subtracting means is equal to or greater than zero and said number of slots counted is equal to or greater than said preselected threshold assigned to slots.

13. The CDMA transmitter/receiver as claimed in claim 12, wherein said transmission power control-OFF command comprises a transmission power control command for lowering the transmission power and a transmission power control command for raising said transmission power that alternate with each other slot by slot.

14. The CDMA transmitter/receiver as claimed in claim 1, wherein said transmission power control-OFF command comprises a transmission power control command for lowering the transmission power and a transmission power control command for raising said transmission power that alternate with each other slot by slot.

15. A CDMA transmitter/receiver comprising:
    a SIR calculator configured to calculate SIRs of a received signal slot by slot; and a command generating circuit configured to generate a transmission power control command and a transmission power control-OFF command, said transmission power control command being generated when the SIR decreases or increases from a reference value, said transmission power control command being a command that causes a station, which is sending the received signal, to lower or raise transmission power so as to restore the SIR toward the reference value, said transmission power control-OFF command for interrupting a transmission power control being generated when the SIR continuously decreases over a preselected number of slots;

wherein said transmission power control-OFF command, if generated, is inserted in a radio frame to be sent to the station, otherwise said transmission power control command is inserted in said radio frame.

* * * * *